United States Patent [19]
Yoshinori et al.

[11] Patent Number: 6,105,667
[45] Date of Patent: Aug. 22, 2000

[54] AIR CONDITIONING APPARATUS FOR VEHICLE SEAT

[75] Inventors: Takeshi Yoshinori, Okazaki; Shinji Aoki, Chiryu; Hajime Ito, Kariya, all of Japan

[73] Assignee: Denso Corporation, Kariya, Japan

[21] Appl. No.: 09/260,907

[22] Filed: Mar. 2, 1999

[30] Foreign Application Priority Data

Mar. 12, 1998 [JP] Japan ................................ 10-061203
Mar. 25, 1998 [JP] Japan ................................ 10-076843

[51] Int. Cl.⁷ ............................... F25B 29/00; B60H 1/00
[52] U.S. Cl. .......................... 165/202; 165/42; 165/43; 165/299; 165/240; 237/12.3 R; 237/12.3 A; 237/12.3 B; 237/2 A; 454/75; 454/120; 454/907; 219/202
[58] Field of Search ............................. 165/42, 43, 202, 165/203, 204, 299, 240; 237/12.3 B, 12.3 A, 12.3 R, 2 A; 454/120, 907, 75; 219/202

[56] References Cited

U.S. PATENT DOCUMENTS

| | | | |
|---|---|---|---|
| 2,718,839 | 9/1955 | Wilfert | 454/120 |
| 3,127,931 | 4/1964 | Johnson | 454/907 |
| 3,394,887 | 7/1968 | Megargle et al. | 454/907 |
| 4,572,430 | 2/1986 | Takagi et al. | 165/42 |
| 5,279,459 | 1/1994 | Single, II | 237/2 A |
| 5,450,894 | 9/1995 | Inoue et al. | 165/43 |
| 5,921,100 | 7/1999 | Yoshinori et al. | 237/12.3 A |
| 5,921,314 | 7/1999 | Schuller et al. | 165/43 |

FOREIGN PATENT DOCUMENTS

| | | | |
|---|---|---|---|
| 59-164552 U | 11/1984 | Japan . | |
| 0113511 | 5/1986 | Japan | 165/42 |
| 0191212 | 8/1987 | Japan | 454/120 |
| 7-49142 | 2/1995 | Japan . | |

*Primary Examiner*—John K. Ford
*Attorney, Agent, or Firm*—Harness, Dickey & Pierce, PLC

[57] ABSTRACT

An air conditioning apparatus for a vehicle seat includes a seat blower unit disposed in a lower side of the seat, and a seat duct for leading air from an air conditioning unit to the seat through the seat blower unit. In the air conditioning apparatus, it can be determined that heat load of a passenger compartment is decreased to a predetermined value based on an operation state of a unit blower of the air conditioning unit, and the seat blower is stopped when the heat load is decreased to the predetermined value. Further, the seat blower is turned on or off according to the heat load of the passenger compartment, so that temperature of the seat can be controlled within a predetermined range. On the other hand, even when the unit blower is stopped when a water temperature of a heating unit of the air conditioning unit is lower than a set temperature, the seat blower unit and an electrical heater disposed in the seat duct are operated so that air passing through the heating unit is heated by the electrical unit and is blown into the seat by the seat blower unit.

9 Claims, 8 Drawing Sheets

AIR CONDITIONING APPARATUS FOR VEHICLE SEAT

CROSS-REFERENCE TO RELATED APPLICATION

This application is related to and claims priority from Japanese Patent Applications No. Hei. 10-61203 filed on Mar. 12, 1998, and No. Hei. 10-76843 filed on Mar. 25, 1998.

BACKGROUND OF THE INVENTION

1. Field of the Invention:

The present invention relates to an air conditioning apparatus for a vehicle seat, which supplies air toward an air passage in the seat to be blown air toward a passenger seated on the seat from a surface sheet of the seat.

2. Description of Related Art:

In a conventional air conditioning apparatus for a vehicle seat described in JP-U-59-164552, air conditioned in a front air conditioning unit is supplied to an air chamber within the seat through a seat duct, and air in the air chamber is blown from a surface sheet of the seat to improve pleasant feeling for a passenger seated on the seat in the passenger compartment. However, during a heating mode, when warm air is continually blown toward the seat so that temperature of a surface sheet of the seat becomes high, over-heating may be given to the passenger. On the other hand, during a stationary cooling state where the temperature in the passenger compartment is lowered from a cool-down state to a stable temperature, over-cooling may be given to the passenger. In this case, a temperature sensor may be disposed within the seat, and the temperature of air blown into the seat may be controlled according to the temperature within the seat. However, the temperature sensor adds cost to the air conditioning apparatus for the vehicle seat, and is difficult to be provided within the seat.

Further, in the conventional air conditioning apparatus, conditioned air is not blown into the seat before a unit blower of the front air conditioning unit is operated, warm air is not immediately blown from the surface sheet of the seat, and the seat is not quickly heated.

SUMMARY OF THE INVENTION

In view of the foregoing problems, it is a first object of the present invention to provide an air conditioning apparatus for a vehicle seat, which can control the temperature of the seat without using a temperature sensor within the seat.

It is a second object of the present invention to provide an air conditioning apparatus for a vehicle seat, which can immediately heat the seat using a low power electric heater.

According to a first aspect of the present invention, an air conditioning apparatus for a vehicle seat includes an air conditioning unit for adjusting a temperature of air blown into a passenger compartment, a seat duct for leading air from the air conditioning unit to the seat, an air-blowing stopping unit for stopping an air-blowing from the seat duct to the seat, and a control unit for controlling a stop time for the air-blowing stopping unit. In the air conditioning apparatus, the control unit controls the air-blowing stopping unit to stop the air-blowing from the seat duct to the seat at the stop time. For example, during a heating mode, the heat load of the passenger compartment is decreased as the temperature of the passenger compartment increases. In this case, when the heat load of the passenger compartment is decreased to a predetermined value, the air-blowing from the seat duct to the seat can be stopped by the air-blowing stopping unit. Thus, the temperature of the seat is controlled without using a temperature sensor provided in the seat, over-heating for a passenger seated on the seat is prevented in the heating mode. On the other hand, during a cooling mode, the heat load of the passenger compartment is decreased as the temperature of the passenger compartment decreases. In this case, when the heat load of the passenger compartment is decreased to a predetermined value, the air-blowing from the seat duct to the seat can be stopped by the air-blowing stopping unit. Thus, the temperature of the seat is controlled without using a temperature sensor disposed within the seat, and over-cooling for a passenger seated on the seat is prevented in the cooling mode.

Preferably, the air-blowing stopping unit is a seat blower disposed in the seat duct. Therefore, when the seat blower is stopped, the air-blowing from the seat duct to the seat can be readily stopped.

More preferably, the air-blowing stopping unit is switching door, and the switching door is disposed in the seat duct to open and close an air passage leading air into the seat. Therefore, the air-blowing from the seat duct to the seat is readily controlled by the switching door.

According to a second aspect of the present invention, even when a unit blower for blowing air in the air conditioning unit into the passenger compartment is stopped when temperature of thermal medium of a heating unit of the air conditioning unit is lower than a first predetermined temperature, a seat blower and an electrical heater disposed in the seat duct are operated when the temperature of the thermal medium is higher than a set temperature lower than the first predetermined temperature. In this case, because the temperature of the thermal medium is higher than the set temperature (e.g., 15–20° C.) even when the set temperature is lower than the first predetermined temperature, air passing through the heating unit can be slightly heated, and is further heated by the electrical heater in the seat duct. Therefore, air blown toward the seat by the seat blower is sufficiently heated. Thus, even when the unit blower of the air conditioning unit is stopped, the seat can be quickly heated using the electrical heater with a low power.

Preferably, the electrical heater is turned off, when the temperature of the thermal medium is increased to a second predetermined temperature higher than the first predetermined temperature during the heating mode. When the temperature of the thermal medium is higher than the second temperature (e.g., 70° C.), air blown toward the seat can be sufficiently heated by the heating unit even when the electrical heater is turned off.

More preferably, the seat blower has a blower level for controlling an amount of air blown toward the seat, and the blower level of the seat blower is controlled according to the temperature of the thermal medium. Therefore, the temperature of air blown toward the seat can be readily controlled by controlling the blower level of the front seat.

BRIEF DESCRIPTION OF THE DRAWINGS

Additional objects and advantages of the present invention will be more readily apparent from the following detailed description of preferred embodiments when taken together with the accompanying drawings, in which.

DESCRIPTION OF THE PRESENTLY PREFERRED EMBODIMENTS

Preferred embodiments of the present invention are described hereinafter with reference to the accompanying drawings.

Figure 1:
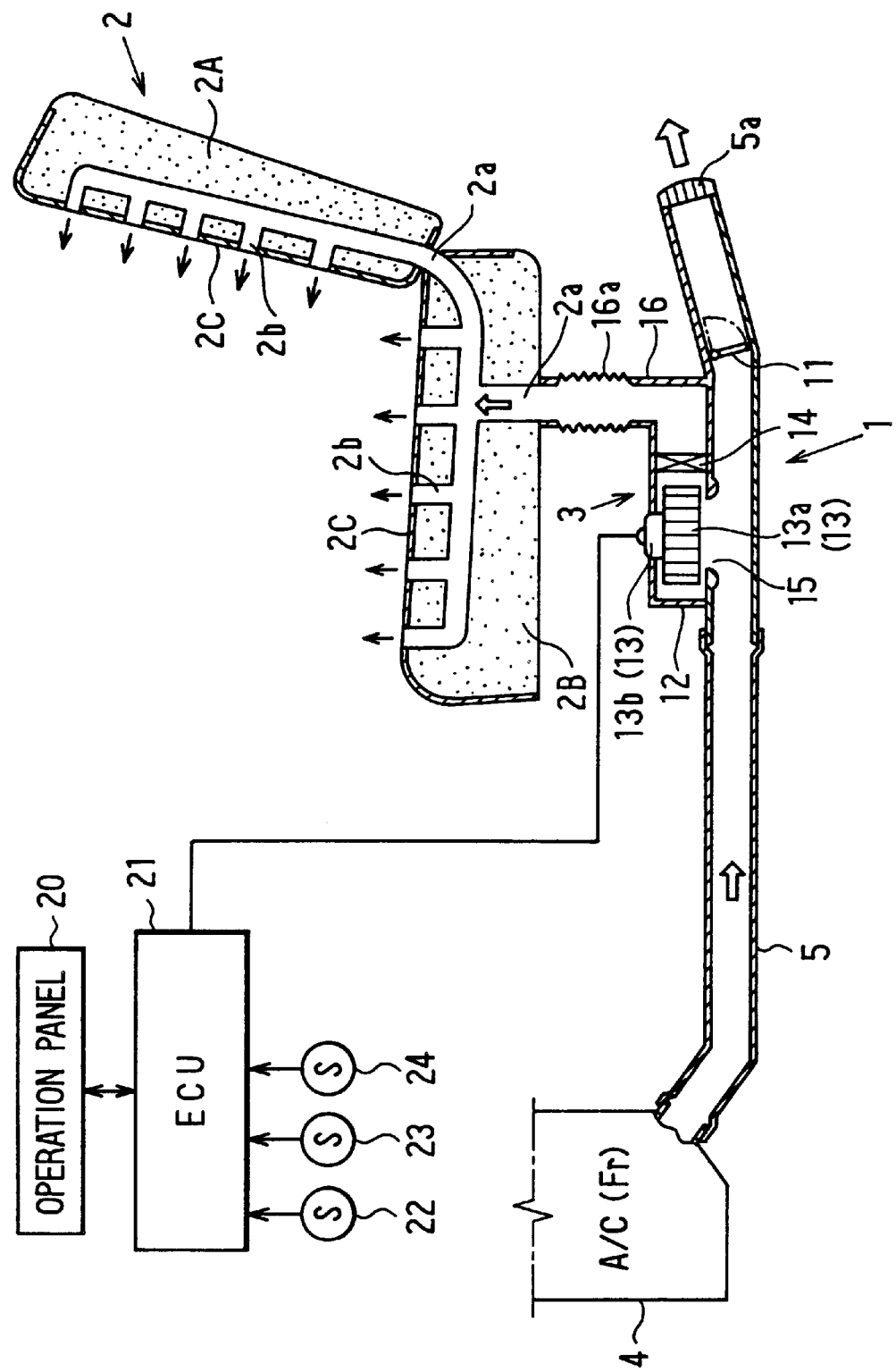
FIG. 1 is a schematic view showing an air conditioning apparatus for a vehicle seat according to a first preferred embodiment of the present invention.

A first preferred embodiment of the present invention will be now described with reference to FIGS. 1–3. As shown in FIG. 1, an air conditioning apparatus 1 for a vehicle seat includes a seat blower unit 3 disposed under a front seat 2, and a seat duct 5 for supplying air from a front air conditioning unit 4 to the seat blower unit 3.

The front air conditioning unit 4 can control the temperature of blown-air according to a target air temperature (TAO) calculated in an electronic control unit (ECU) 21, and the conditioned air is blown into the a passenger compartment of the vehicle to adjust the temperature in the passenger compartment. Operation signals from an operation panel 20 and various sensor signals from sensors such as an inside air temperature sensor 22, an outside air temperature sensor 23 and a sunlight sensor 24 are input to the ECU 21. According to the input signals, the ECU 21 controls components of the front air conditioning unit 4 so that the temperature of air blown into the passenger compartment is adjusted to the target air temperature (TAO). The inside air temperature sensor 22 detects a temperature of inside air (i.e., air inside the passenger compartment), the outside air temperature sensor 23 detects a temperature of outside air (i.e., air outside the passenger compartment), and the sunlight sensor 24 detects an amount of sunlight entering the passenger compartment. In the operation panel 20, a seat switch for performing seat air-conditioning is provided.

In the first embodiment, a rear foot duct for supplying warm air from the front air conditioning unit 4 toward the foot area of a passenger seated on a rear seat is used as the seat duct 5, for example. A rear foot air outlet 5a for the rear seat of the passenger compartment is provided in the seat duct 5 at a most downstream air side, and a switching door 11 for opening and closing the foot air outlet 5a is disposed in the seat duct 5 at an upstream air side of the rear foot air outlet 5a. The switching door 11 is rotated between the solid line position and the chain line position in FIG. 1, and is driven by an actuator (not shown) such as a servomotor. The actuator for the switching door 11 is electrically controlled by the ECU 21. When the seat switch of the operation panel 20 is turned on, the switching door 11 is rotated to the solid line position in FIG. 1 to close the rear foot air outlet 5a. On the other hand, when the seat switch of the operation panel 20 is turned off, the switching door 11 is rotated to the chain line position in FIG. 1 to open the rear foot air outlet 5a.

The seat blower unit 3 includes a case 12 for forming an air passage, a seat blower 13 accommodated in the case 12, and an electrical heater 14 (e.g., PTC heater) disposed at a downstream air side of the seat blower 13. The case 12 has a suction port 15 for the seat blower 13, and communicates with the seat duct 5 through the suction port 15. Further, the case 12 is connected to the front seat 2 through a connection duct 16. The connection duct 16 may be integrated with the case 12, or may be separated from the case 12. Bellows 16a are provided in the connection duct 16, so that the connection duct 16 is moved to correspond to a movement of the front seat 2.

The seat blower 13 includes centrifugal fans 13a and a motor 13b for rotating the centrifugal fans 13a. Air sucked from the suction port 15 is blown vertically by the centrifugal fans 13a. The seat blower 13 is operated when the seat switch of the operation panel 20 is turned on, and the operation of the seat blower 13 is electrically controlled by the ECU 21 according to heat load within the passenger compartment.

The electrical heater 14 is turned on, when the temperature of engine-cooling water is low and air is not heated sufficiently in a heating unit of the front air conditioning unit 4. The electrical heater 14 may be disposed at an upstream air side of the seat blower 13.

The front seat 2 includes a seat back 2A and a seat cushion 2B each of which is covered by a seat surface sheet 2C having air permeability. An air distribution duct 2a and a plurality of seat air outlets 2b are formed within the seat back 2A and the seat cushion 2B. The air distribution duct 2a is connected to the connection duct 16 to communicate with the connection duct 16. The seat air outlets 2b are branched from the air distribution duct 2a to extend to the surfaces of the seat back 2A and the seat cushion 2B. Thus, air supplied by the seat blower unit 3 is distributed into each seat air outlet 2b through the air distribution duct 2a, and is blown toward the passenger seated on the front seat 2 from each seat air outlet 2b through the seat surface sheet 2C.

Next, heating operation of the air conditioning apparatus according to the first embodiment will be typically described.

When the seat switch of the operation panel 20 is turned on, the switching door 11 within the seat duct 5 is rotated to close the rear foot air outlet 5a, and the seat blower 13 is operated. In the first embodiment, when the seat switch is turned on, the front air conditioning unit 4 is operated through the ECU 21. Therefore, warm air supplied from the front air conditioning unit 4 to the seat duct 5 is blown into the front seat 2 by the seat blower unit 3, so that the temperature of the front seat 2 is increased. During a warm-up state in the heating mode, when the heat load of the passenger compartment is lowered as the temperature of the passenger compartment increases, heat radiated from the front seat 2 becomes smaller, and over-heating may be given to the passenger seated on the front seat 2.

In the first embodiment, the ECU 21 determines whether or not the heat load of the passenger compartment is lowered to a predetermined value, according to operation state of the unit blower of the front air conditioning unit 4, and the ECU 21 stops the operation of the seat blower 13 when the heat load of the passenger compartment is lowered to the predetermined value. The operation of the seat blower 13 is controlled based on the graphs shown in FIG. 2 according to the temperature of the passenger compartment or the operation state of the unit blower, so that the temperature of the front seat 2 is controlled. As shown in FIG. 2, "T0" is time until the operation of the seat blower 13 is firstly stopped after the seat blower 13 starts operating. In the first embodiment, the time T0, the time Ton and the time Toff for the seat blower 13 are controlled so that the temperature of the front seat 2 is controlled as shown in FIG. 2. That is, the seat blower 13 is firstly turned off after the seat blower 13 is operated in the time T0, and is turned off within the time Toff. Thereafter, the seat blower 13 is turned on again in a predetermined time Ton. Thereafter, the seat blower 13 is further controlled according to the times of Toff and Ton. An increased speed of the temperature of the front seat 2 is changed by the heat load of the passenger compartment. For example, when the heat load of the passenger compartment is large, that is, when the temperature (Tr) of the passenger compartment is low, the temperature of the front seat 2 is slowly increased. Therefore, the Toff and Ton may be corrected according to the temperature (Tr) of the passenger compartment based on graphs shown in FIGS. 3A, 3B. As a result, the temperature of the front seat 2 can be controlled within a predetermined range by turning on or off the seat blower 13, as shown in FIG. 2. In the first embodiment of the present invention, the heat load of the passenger compartment is determined based on the operation state of the unit blower of the front air conditioning unit 4, the temperature of the passenger compartment, or the like. That is, as shown in FIG. 2, when an air-blowing amount from the unit blower of the front air conditioning unit 4 is at a threshold value (Vth), or when the temperature of the passenger compartment is increased to a set temperature (Tset), it can be determined that the heat load of the passenger compartment is lowered to the predetermined value, and the seat blower 13 is firstly stopped.

According to the first embodiment of the present invention, when heat load of the passenger compartment is lowered to the predetermined value during the warm-up state in the heating mode, the seat blower 13 is stopped. Therefore, it can prevent the temperature of the front seat 2 from being excessively increased. Further, after the seat blower 13 is stopped once, the times of Toff and Ton of the seat blower 13 are controlled so that the temperature of the front seat 2 can be controlled within the predetermined range. Therefore, pleasant heating can be given to the passenger seated on the front seat 2. Further, because the times of Toff and Ton are corrected in accordance with the heat load of the passenger compartment, the temperature of the front seat 2 can be controlled to correspond to a change of the heat load of the passenger compartment. In the first embodiment, because the seat blower 13 is controlled based on the operation state of the unit blower and the sensor signals of the ECU 21, the temperature of the front seat 2 can be controlled without using a seat temperature sensor for detecting the temperature of the front seat 2.

In the above-described first embodiment, the heating operation of the air conditioning apparatus 1 is typically described. However, during cooling operation of the air conditioning apparatus 1, the seat blower 13 can be controlled according to the heat load of the passenger compartment, so that the temperature of the front seat is prevented from being excessively lowered.

In the above-described first embodiment, the time T0 from starting the operation of the seat blower 13 until firstly stopping the operation of the seat blower 13 is controlled in accordance with the operation state of the unit blower or the temperature of the passenger compartment. However, the time T0 may be controlled based on a physical amount relative to the heat load of the passenger compartment, such as the temperature of air blown into the passenger compartment, the target air temperature (TAO), the temperature of outside air, or the sunlight amount entering into the passenger compartment. Further, the times of Toff and Ton of the seat blower 13 can be corrected based on the physical amount relative to the heat load of the passenger compartment.

In the above-described first embodiment, the amount of air blown into the front seat 2 is controlled by controlling the operation of the seat blower 13. For example, when the seat blower is stopped, air is not supplied into the front seat 2. However, a seat door may be disposed, and the amount of air supplying into the front seat 2 may be controlled by the seat door. For example, when the seat door closes an airblowing passage of the seat blower 13, air is not blown into the front seat 2.

Figure 2:
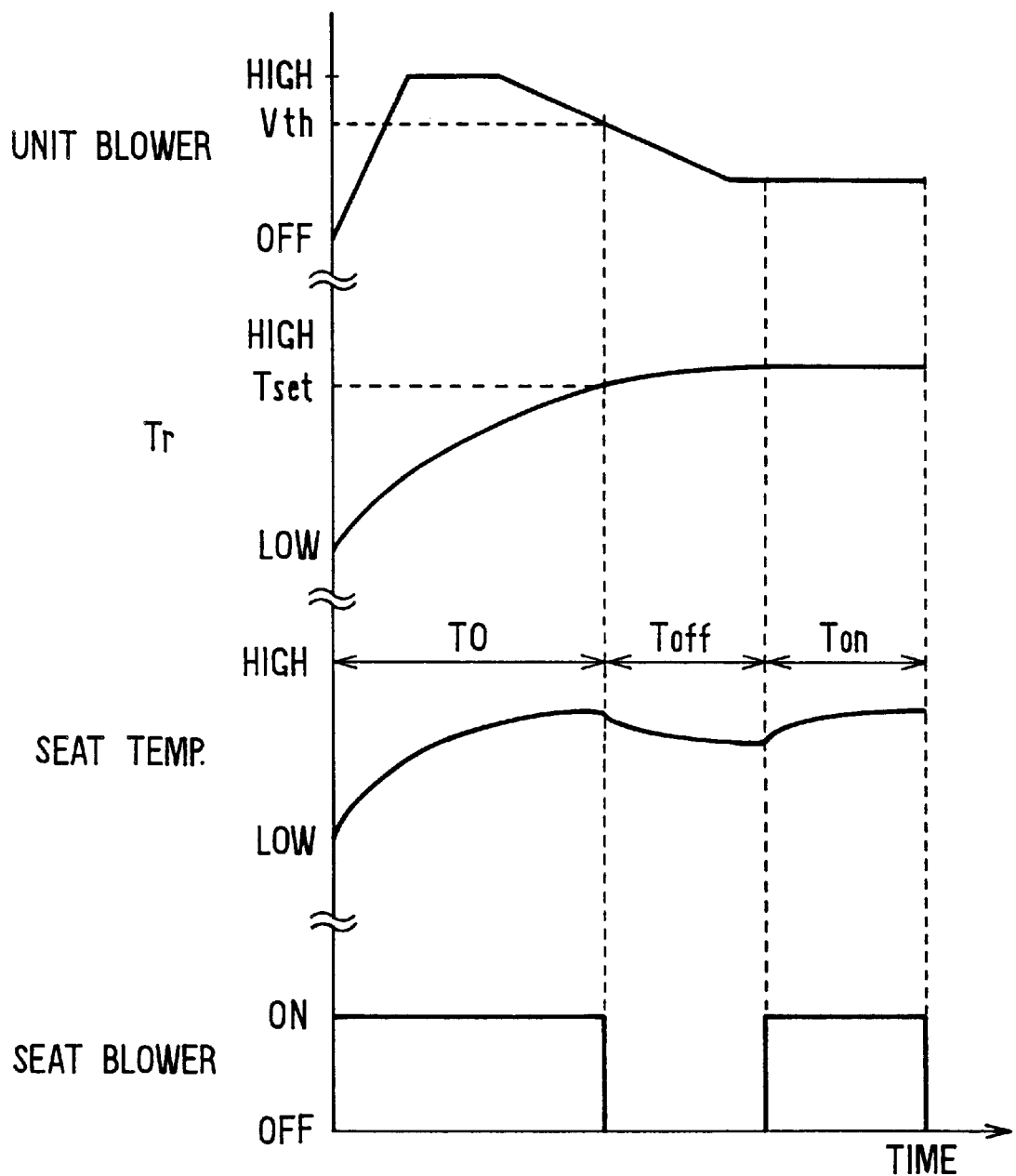
FIG. 2 is graphs for controlling operation of a seat blower to control seat temperature according to the first embodiment.
Figure 3A:
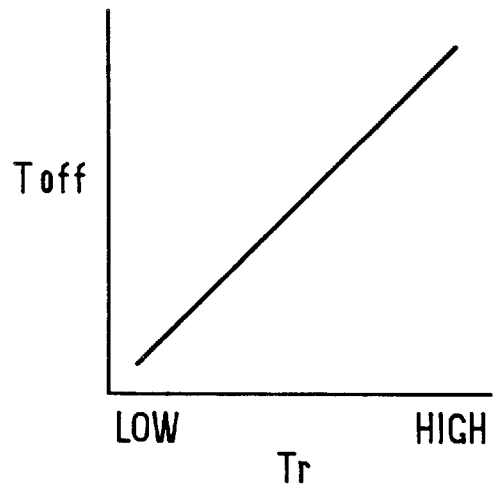
FIG. 3A is a graph showing the relationship between a stopping time (Toff) of a seat blower and temperature (Tr) of a passenger compartment of the vehicle.
Figure 3B:
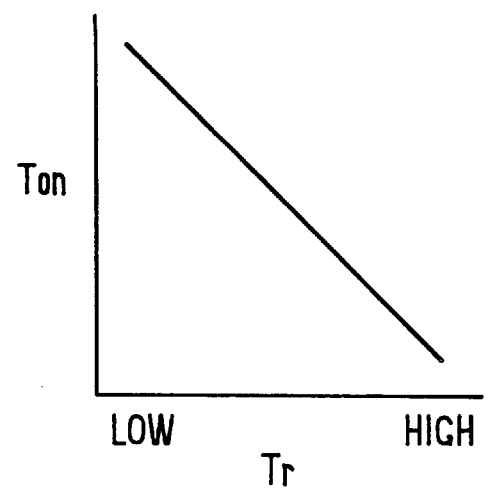
FIG. 3B is a graph showing the relationship between a re-operating time (Ton) of the seat blower and the temperature (Tr) of the passenger compartment.

Further, in the above-described first embodiment, when the seat switch of the operation panel 20 is turned on, the unit blower of the front air conditioning unit 4 is operated, as shown in FIG. 2. However, in a case where the unit blower of the front air conditioning unit 4 is stopped until the temperature of engine-cooling water is increased to a predetermined temperature, the starting operation of the seat blower 13 may be performed to correspond to the starting operation of the unit blower. Further, after the electrical heater 14 is turned on in a predetermined time so that the temperature of air supplying into the front seat 2 is increased to a predetermined temperature, the seat blower 13 may be operated.

Further, in the above-described first embodiment, the seat switch of the operation panel 20 is turned on so that the seat blower 13 is operated However, the operation of the seat blower 13 may be started by turning on a blower switch of the front air conditioning unit 4, an air conditioning operation switch or an automatic air conditioning switch.

A second preferred embodiment of the present invention will be now described with reference to FIGS. 4–10B. In the second embodiment, the same components as the first embodiment are indicated with the same reference numbers, and the explanation thereof is omitted.

Figure 4:
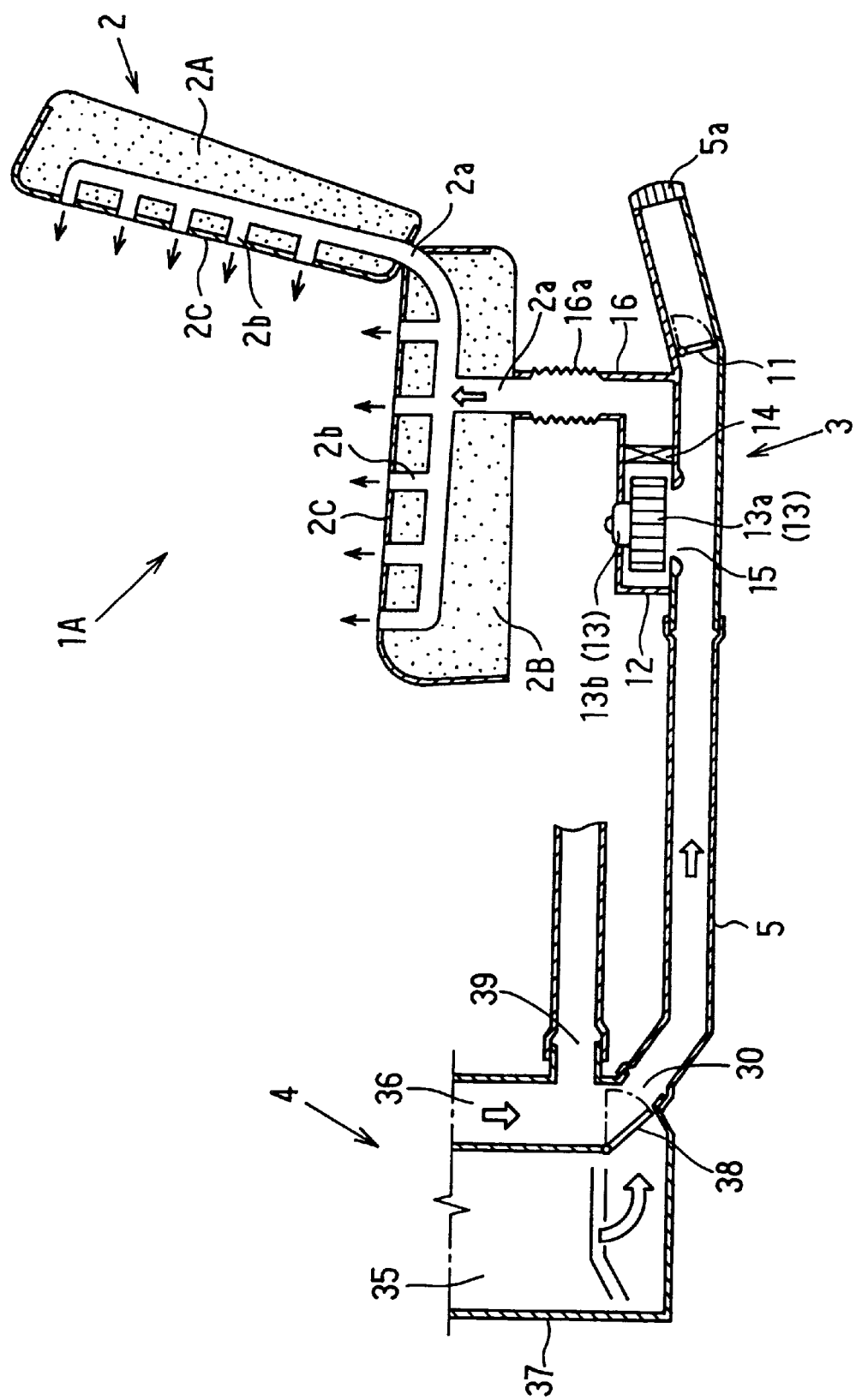
FIG. 4 is a schematic sectional view showing an air conditioning apparatus for a vehicle seat according to a second preferred embodiment of the present invention.

In an air conditioning apparatus 1A of the second embodiment, as shown in FIG. 4, the front air conditioning unit 4 has an air conditioning case 37 for forming therein a cool air passage 35 and a warm air passage 36, and a switching door 38 for opening and closing the cool air passage 35 and the warm air passage 36. The front air conditioning unit 4 further includes a heater core for heating the passenger compartment using engine-cooling water as a heating source. The air conditioning case 37 has a front foot air outlet 39 for blowing warm air toward the foot area of a passenger seated on a front seat through the warm air passage 36, and a connection port 30 to which the seat duct 5 is connected. Through the connection port 30, the seat duct 5 can communicate with the cool air passage 35 or the warm air passage 36 selected by the switching door 38.

The switching door 38 is disposed in the air conditioning case 37 to be rotated between a solid line position and a chain line position in FIG. 4, and is driven by an actuator such as a servomotor. When the switching door 38 is rotated to the solid line position in FIG. 4, the cool air passage 35 is closed and the warm air passage 36 is fully opened. On the other hand, when the switching door 38 is rotated to the chain line position in FIG. 4, the cool air passage 35 is fully opened and the warm air passage 36 is fully closed.

Figure 5:
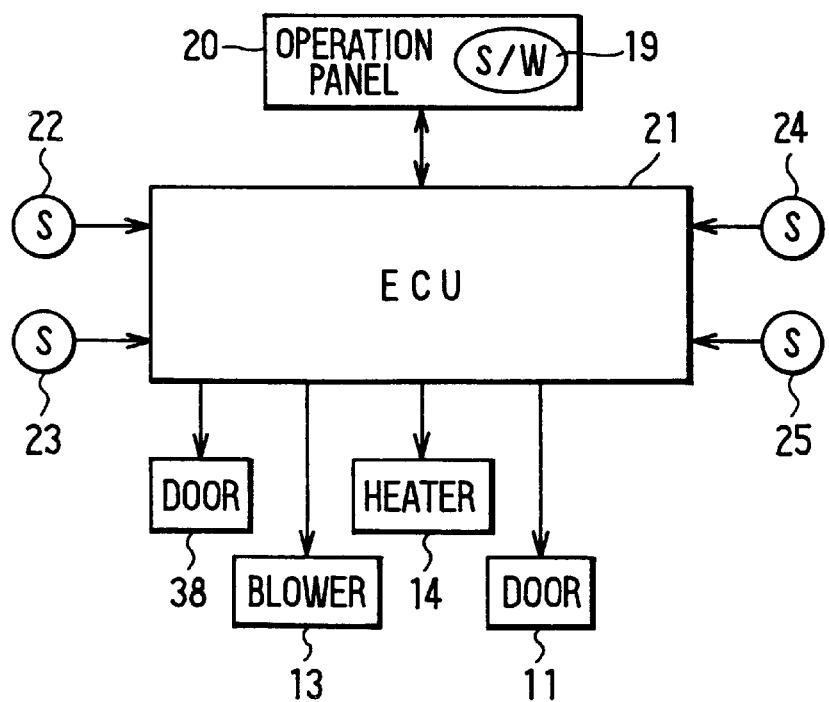
FIG. 5 is a block diagram for controlling the air conditioning apparatus according to the second embodiment.

In the second embodiment, as shown in FIG. 5, when a seat switch 19 provided in the operation panel 20 is turned on, operations of the switching door 8, the seat blower 13, the electrical heater 14 and the switching door 11 are controlled by the ECU 21. In the ECU 21, the target air temperature (TAO) is calculated based on operation signals output from switch operations of the operation panel 19, and various sensor signals output from the inside air temperature sensor 22, the outside air temperature sensor 23, the sunlight temperature sensor, a water temperature sensor 25 for detecting the temperature of the engine-cooling water, and the like. According to the calculated TAO, the ECU 21 outputs control signals to actuators for the switching door 38, the seat blower 13, the electrical heater 14 and the switching door 11.

Next, control processes of the air conditioning apparatus 1A for the vehicle seat according to the second embodiment of the present invention will be described based on flow diagram shown in FIG. 6.

Figure 6:
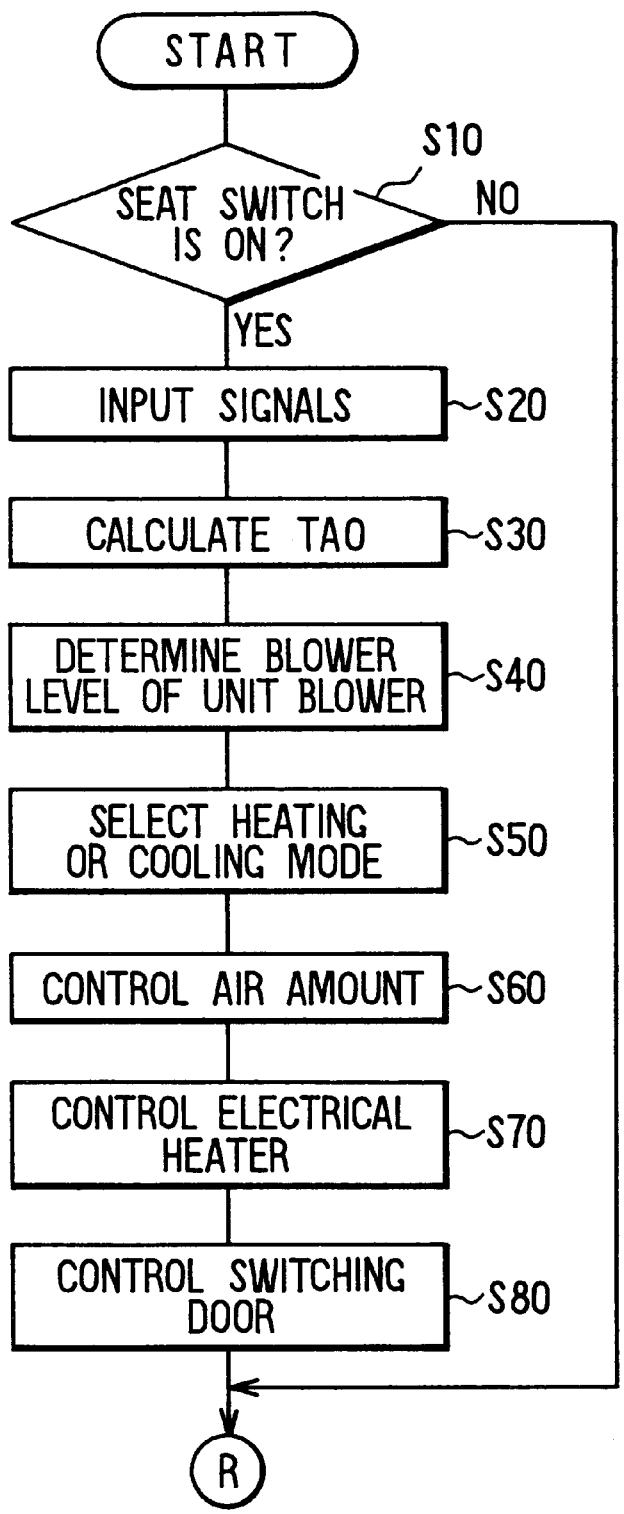
FIG. 6 is a flow diagram of control process of an electronic control unit (ECU) of the air conditioning apparatus according to the second embodiment.

As shown in FIG. 6, firstly it is determined whether or not the seat switch 19 of the operation panel 20 is turned on at step S10. When the seat switch 19 is turned on at step S10, switch signals from the operation panel 20 and sensor signals from the various sensors are input into the ECU 21 at step S20. Further, the TAO is calculated based on the input signals at step S30.

Figure 7:
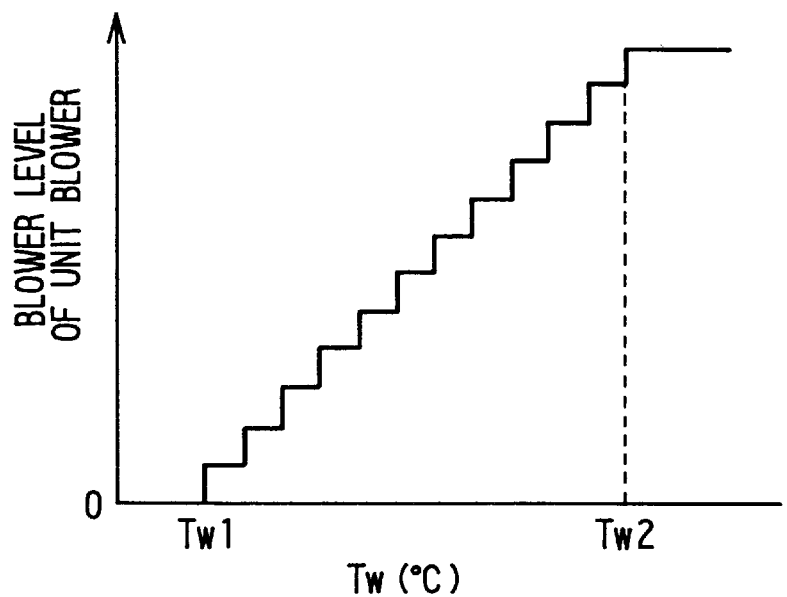
FIG. 7 is a graph showing the relationship between a blower level of a unit blower and a water temperature (Tw) according to the second embodiment.

Next, at step S40, a blower level of the unit blower of the front air conditioning unit 4 is determined based on the calculated TAO. In the second embodiment, when the temperature of the engine cooling water (hereinafter referred to as "water temperature Tw") is lower than a set temperature Tw2 (e.g., 60° C.), the blower level of the unit blower is determined based on a water temperature control graph shown in FIG. 7. That is, as shown in FIG. 7, the blower level of the unit blower is set to zero until the water temperature Tw is increased to a set temperature Tw1 (e.g., 35° C.) lower than the set temperature Tw2, and the operation of the unit blower of the front air conditioning unit 4 is stopped. On the other hand, as the water temperature Tw increases from the set temperature Tw1 to the set temperature Tw2, the blower level of the unit blower is increased linearly or stepwise.

Next, at step S50 in FIG. 6, the rotation position of the switching door 38 is controlled based on the calculated TAO. That is, the cooling mode or the heating mode is selected by the switching door 38 at step S50. For example, in the cooling mode where the target air temperature (TAO) is lower than a set temperature, the switching door 38 opens the cool air passage 35 and closes the warm air passage 36. On the other hand, in the heating mode where the target air temperature (TAO) is higher than the set temperature, the switching door 38 opens the warm air passage 36 and closes the cool air passage 35.

Next, at step S60, a blower level of the seat blower 13 is determined based on the target air temperature (TAO) calculated at step S30. That is, at step S60, air amount blown by the seat blower 13 is determined. In this case, when the water temperature Tw is lower than a set temperature Tw5 (e.g., 55° C.) during the heating mode, the blower level of the seat blower 13 is determined according to the graph in FIG. 8. That is, when the water temperature is in a range from Tw3 (e.g., 0° C.) to Tw4 (e.g., 35° C.), the blower level of the seat blower 13 is set to 1. Further, when the water temperature Tw is in a range from Tw4 to Tw5 (e.g., 55° C.), the blower level of the seat blower 13 is linearly or stepwise increased as the water temperature Tw increases.

Figure 8:
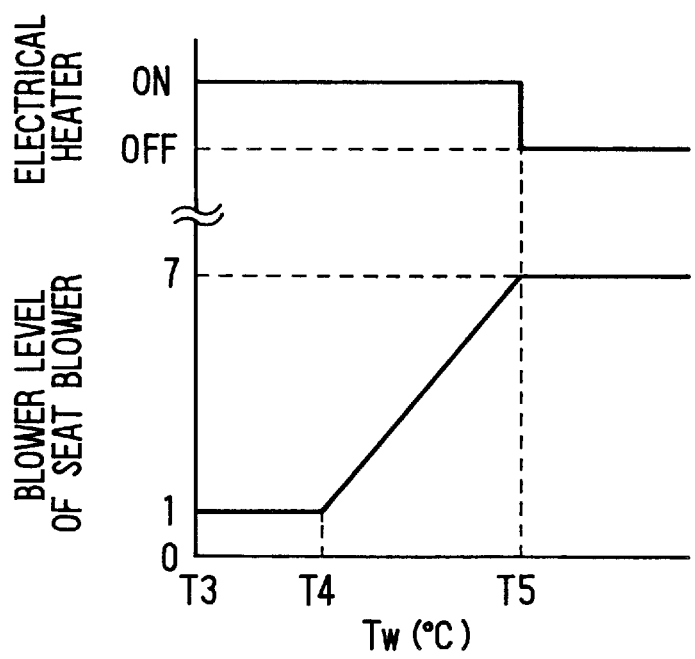
FIG. 8 is graphs showing the relationship between the water temperature (Tw) and a blower level of a seat blower, and the relationship between the water temperature (Tw) and an operation state of an electrical heater, according to the second embodiment.

Further, only when the heating mode is set, operation S5 of the electrical heater 14 is controlled based on the graph shown in FIG. 8, at step S70. That is, when the water temperature Tw is in a range from the set temperature Tw3 to the set temperature Tw5 during the heating mode, the electrical heater 14 is turned on. When the water temperature is higher than the set temperature Tw5 (e.g., 55° C.), the electrical heater 14 is turned off.

Further, at step S80 in FIG. 6, the switching door 11 disposed within the seat duct 5 is controlled. For example, when a temperature difference between a set temperature and the temperature of the passenger compartment (or a seat temperature) is large, that is, when the cool-down state or warm-up state is set, the switching door 11 closes the rear foot air outlet 5a. On the other hand, when the temperature difference between the set temperature and the temperature of the passenger compartment is small, that is, in the stationary state, the switching door 15 opens the rear foot air outlet 5a.

Next, the operation of the air conditioning apparatus 1A according to the second embodiment will be now described.

(1) COOLING MODE

Figure 9A:
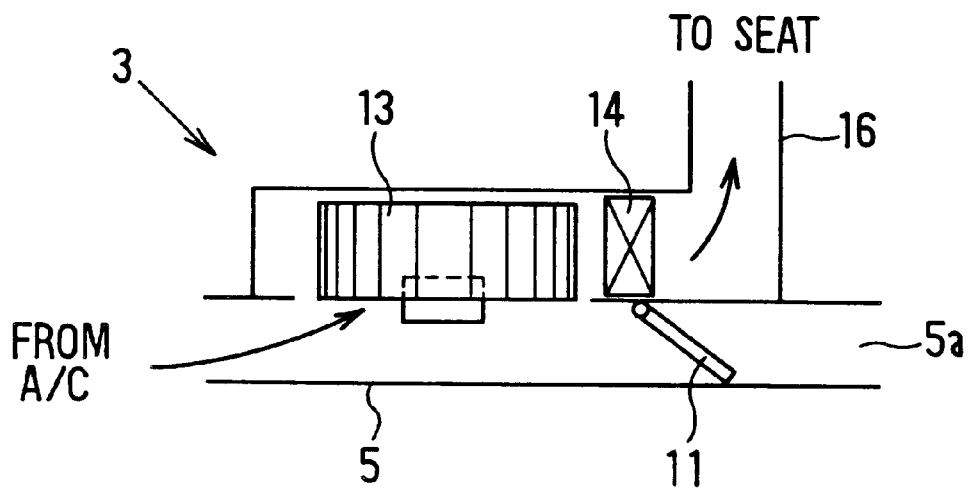
FIG. 9A is a diagrammatic view of a seat blower unit during a cool-down state.

When the temperature difference between the set temperature and the temperature of the passenger compartment is large, that is, in the cool-down state during the cooling mode, the switching door 11 of the seat blower unit 3 is rotated to the solid line position to close the rear foot air outlet 5a. Therefore, as shown in FIG. 9A, cool air supplied from the cool air passage 35 of the front air conditioning unit 4 to the seat duct 5 is blown into the front seat 2 through the seat blower unit 3.

Figure 9B:
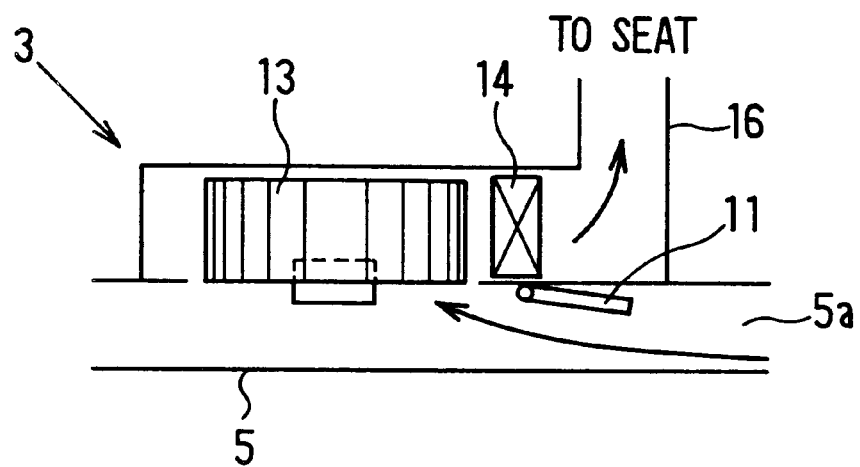
FIG. 9B is a diagrammatic view of the seat blower unit during a stationary state in a cooling mode.

When the temperature in the passenger compartment is lowered to a predetermined temperature and a stationary state is set from the cool-down state during the cooling mode, over-cooling is given to the passenger seated on the front seat 2 when cool air is still blown from the seat surface sheet 2C of the front seat 2. According to the second embodiment of the present invention, in the stationary state, the switching door 38 of the front air conditioning unit 4 closes the cool air passage 35, and the switching door 11 of the seat blower unit 3 opens the rear foot air outlet 5a. In this case, even when the switching door 38 opens the warm air passage 36, warm air does not flows through the warm air passage 36 because the cooling mode is set in the front air conditioning unit 4. Therefore, as shown in FIG. 9B. inside air (i.e., air inside the passenger compartment) is sucked from the rear foot air outlet 5a into the seat duct 5 by the operation of the seat blower 13, and is blown into the front seat 2 by the seat blower unit 3. Because the temperature of inside air of the passenger compartment is higher than the temperature of cool air conditioned by the front air conditioning unit 4, it can prevent the over-cooling due to air blown from the seat surface sheet 2C of the front seat 2.

(2) HEATING MODE

Figure 10A:
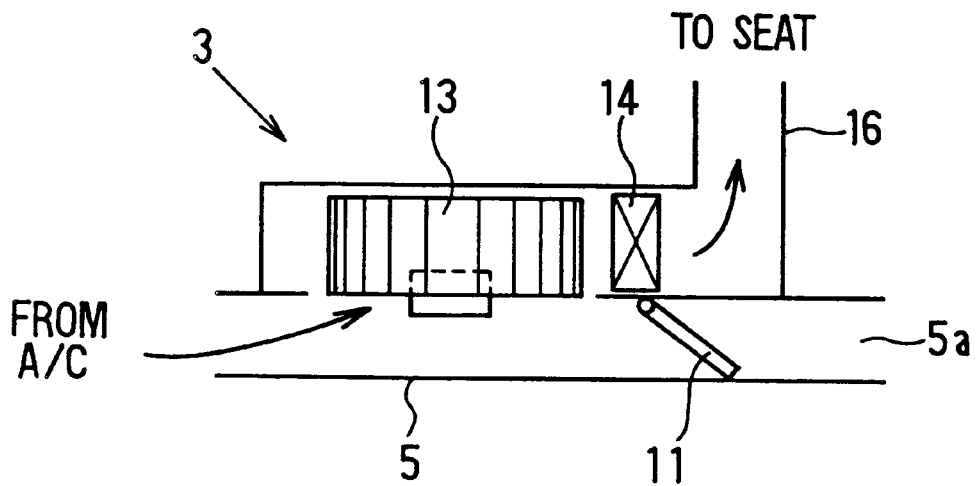
FIG. 10A is a diagrammatic view of the seat blower unit during a warm-up state.

When the temperature difference between the set temperature and the temperature of the passenger compartment is large, that is, in the warm-up state during the heating mode, the switching door 11 of the seat blower unit 3 closes the rear foot air outlet 5a as shown in FIG. 10A. At this time, the unit blower of the front air conditioning unit 4 is stopped until the water temperature Tw is increased to a predetermined temperature (e.g., 35° C.). However, when the water temperature Tw is higher than a set temperature (e.g., 15° C.) for heating the heating unit to some degree, the seat blower 13 is operated and the electrical heater 14 is turned on. Thus, even when the unit blower of the front air conditioning unit 4 is not operated, the seat blower 13 is operated as shown in FIG. 10A. Therefore, air slightly heated in the heating unit of the front air conditioning unit 4 is sucked into the seat duct 5, is heated in the electrical heater 14, and is blown into the front seat 2 by the operation of the seat blower 13.

Figure 10B:
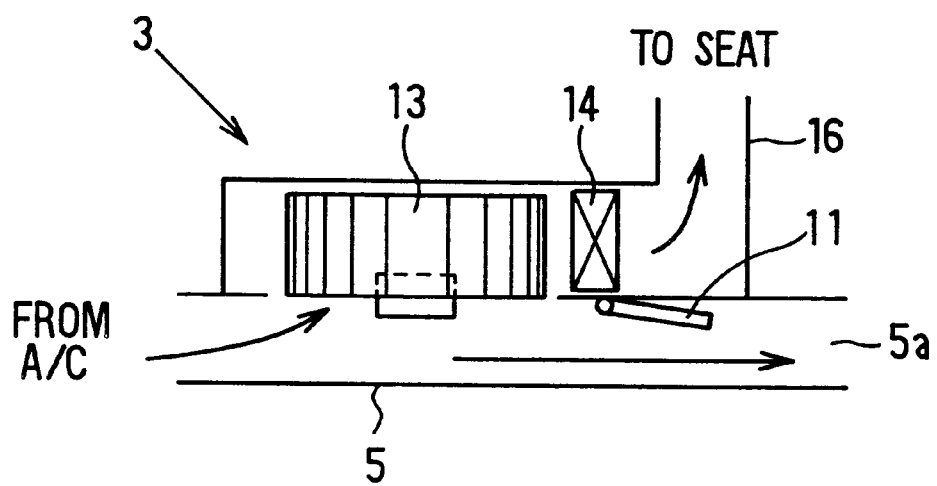
FIG. 10B is a diagrammatic view of the seat blower unit during a stationary state in a heating mode.

On the other hand, when the temperature of the passenger compartment is increased and a stationary state is set from the warm-up state during the heating mode, over-heating may be given to the passenger seated on the front seat 2 when the electrical heater 14 is still turned on. Therefore, in the stationary state during the heating mode, the electrical heater 14 is turned off, so that the over-heating of the front seat 2 is prevented. Further, as shown in FIG. 10B, in the stationary state during the heating mode, the switching door 11 opens the rear foot air outlet 5a, and warm air is blown toward the foot area of a passenger seated on the rear seat of the passenger compartment.

According to the second embodiment of the present invention, in the air conditioning apparatus 1A, even when the unit blower of the front air conditioning unit 4 is not operated in the ward-up state during the heating mode, the seat blower 13 is operated and the electrical heater 14 is turned on when the water temperature Tw is higher than a predetermined temperature at which air can be slightly heated by the heating unit of the front air conditioning unit 4 to some degree. Thus, air slightly heated by the heating unit of the front air conditioning unit 4 is sucked into the seat duct 5, and is blown into the front seat 2 after being heated by the electrical heater 14. Because air having being slightly heated by the heating unit of the front air conditioning unit 4 is re-heated by the electrical heater 14, the temperature of air blown into the front seat 2 can be increased sufficiently (e.g., 40° C.) even when the electrical heater 14 is operated with a low power (e.g., consumption electrical power 150 W). Thus, even when the unit blower of the front air conditioning unit 4 is stopped, the front seat 2 can be quickly heated because warm air heated in the electrical heater 14 is supplied into the front seat 2.

Further, according to the second embodiment of the present invention, because it is not necessary to operate the electrical heater 14 with a large power to quickly heat air supplying into the front seat 2, the air conditioning apparatus 1A is operated in low cost. Further, because the rear foot duct is used as the seat duct 5, the structure of the air conditioning apparatus 1A can be made simple, and the air conditioning apparatus 1A is produced in low cost.

Although the present invention has been fully described in connection with preferred embodiments thereof with reference to the accompanying drawings, it is to be noted that various changes and modifications will become apparent to those skilled in the art.

For example, in the above-described second embodiment of the present invention, when the heating mode is set, the operation for turning on or off the electrical heater 14 is determined based on the water temperature Tw. However, the electrical heater 14 may be turned off according to the heat load of the passenger compartment, the condition of the front air conditioning unit 4, the seat heat load, and the like. Therefore, even when the temperature of the passenger compartment is increased and the stationary state is set from the warm-up state, the electrical heater 14 may be turned on according to at least one of the heat load of the passenger compartment, the condition of the front air conditioning unit 4, and the seat heat load. Further, while the electrical heater 14 is turned on in the stationary condition, the switching door 11 of the seat blower unit 3 may open the rear foot air outlet 5a so that warm air may be supplied toward the passenger on the rear seat.

In the above-described second embodiment of the present invention, the temperature of air blown toward the front seat 2 is controlled based on the target air temperature (TAO) of the front air conditioning unit 4. However, the temperature of air blown toward the front seat 2 may be controlled by a target seat surface temperature.

In the above-described first and second embodiments of the present invention, the seat blower unit 3 may be integrally connected to the front seat 2. In this case, because the seat blower unit 3 is moved integrally with a movement of the front seat 2, the seat blower unit 3 is coupled to the seat duct 5 through the connection duct 16 which moves to correspond to the movement of the front seat 2.

Further, in the above-described first and second embodiments, the rear foot duct of the front air conditioning unit 4 is used as the seat duct 5. However, a rear vent duct for supplying cool air from the front air conditioning unit 4 to a passenger on the rear seat may be used as the seat duct 5.

Such changes and modifications are to be understood as being within the scope of the present invention as defined by the appended claims.

What is claimed is:

1. An air conditioning apparatus for a seat disposed in a passenger compartment of a vehicle, said apparatus comprising:

an air conditioning unit for adjusting a temperature of air blown into the passenger compartment, said air conditioning unit includes
a unit blower for blowing air into the passenger compartment, and
a heating unit for heating air passing therethrough using a thermal medium;
a seat duct for forming an air passage for leading air from said air conditioning unit to the seat;
a seat blower, disposed in said seat duct, for blowing air in said seat duct toward the seat; and
an electrical heater, disposed in said seat duct, for heating air blown into the seat, wherein:
said unit blower is stopped when temperature of the thermal medium is lower than a first predetermined temperature during a heating mode for heating the passenger compartment; and
said seat blower and said electrical heater are operated when the temperature of the thermal medium is higher than a set temperature lower than the first predetermined temperature, in such a manner that air passing through said heating unit of said air conditioning unit is heated by said electrical heater and is blown into the seat through said seat duct.

2. The air conditioning apparatus according to claim 1, wherein said electrical heater is turned off, when the temperature of the thermal medium is increased to a second predetermined temperature higher than the first predetermined temperature during the heating mode.

3. The air conditioning apparatus according to claim 1, wherein said seat duct includes a rear foot duct having an air outlet for blowing air from said air conditioning unit toward a lower rear side of the passenger compartment, and a branch duct for leading air from said rear foot duct to the seat.

4. The air conditioning apparatus according to claim 3, further comprising a switching door for opening and closing said air outlet of said rear foot duct, wherein said switching door closes said air outlet of said rear foot duct when said electrical heater is turned on.

5. The air conditioning apparatus according to claim 1, wherein the thermal medium is a cooling water for cooling an engine of the vehicle.

6. The air conditioning apparatus according to claim 1, wherein said electrical heater is turned off, when a heat load of the passenger compartment is lower than a predetermined value during the heating mode.

7. The air conditioning apparatus according to claim 1, wherein:

said unit blower has a blower level for controlling an amount of air blown into the passenger compartment, and said blower level of said unit blower is controlled according to the temperature of the thermal medium.

8. The air conditioning apparatus according to claim 1, wherein:

said seat blower has a blower level for controlling an amount of air blown toward the seat; and said blower level of said seat blower is controlled according to the temperature of the thermal medium.

9. The air conditioning apparatus according to claim 1, wherein said seat blower is stopped, when heat load of the passenger compartment is lower than a predetermined value during the heating mode.

\* \* \* \* \*